INVENTOR.
FREDERICK P. BINGMAN
BY
ATTORNEY.

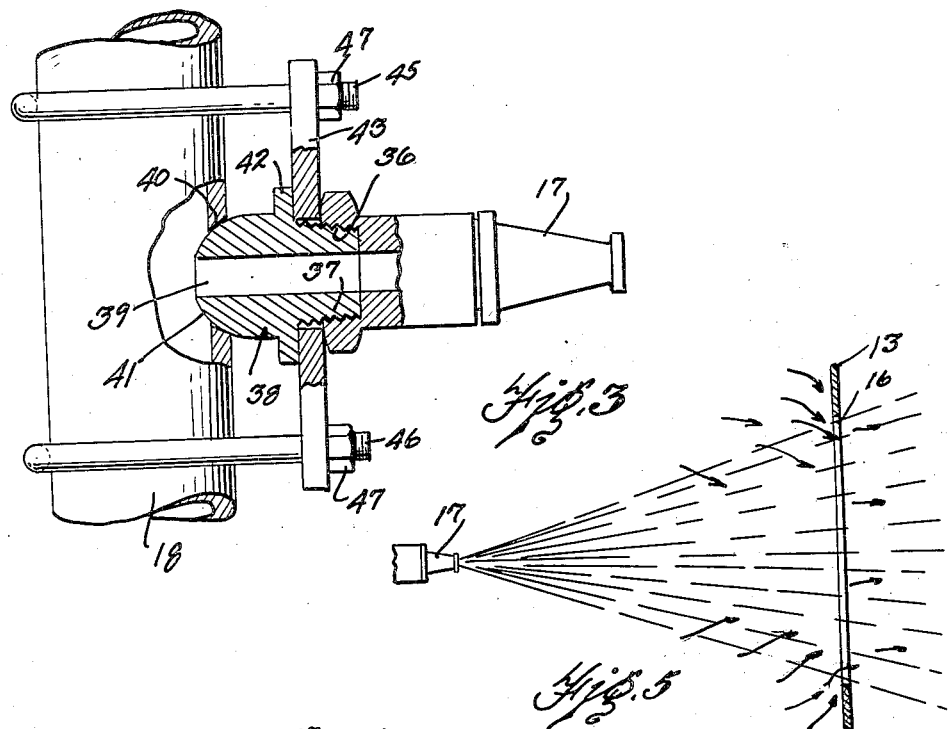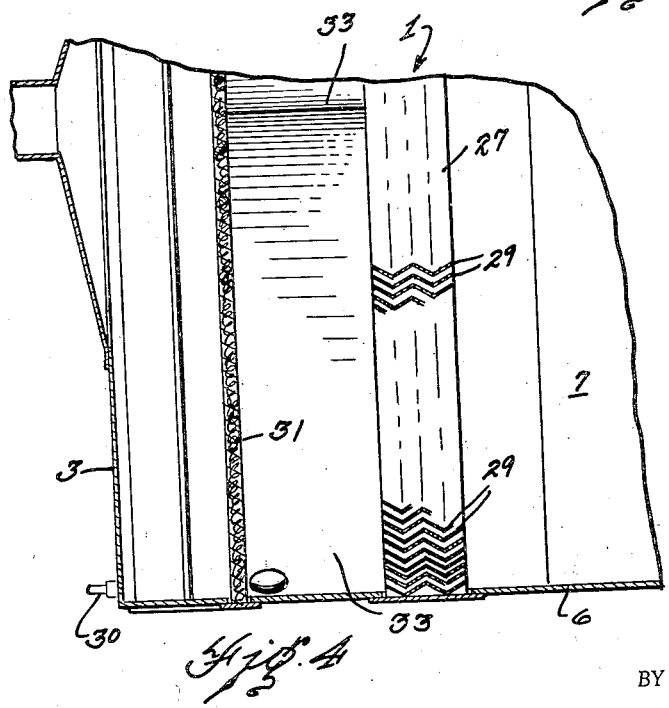

Patented July 10, 1934

1,966,280

UNITED STATES PATENT OFFICE 1,966,280

AIR CLEANER

Frederick P. Bingman, Birmingham, Mich., assignor to The R. C. Mahon Company, Detroit, Mich., a corporation of Michigan Application February 3, 1932, Serial No. 590,672

14 Claims. (Cl. 183—10)

This invention relates to air cleaners, and the principal feature and object of the invention resides in the provision of a spray nozzle so constructed as to discharge a spray of conic form through a sharp edged orifice whereby all of the air is passed through the spray as it is drawn through the cleaner.

Another object of the invention resides in the provision of an air cleaner formed with a plurality of spray nozzles connected to a header and adapted to spray liquid through apertures in a plate, the nozzle being so fitted to the header as to permit the same to be accurately positioned whereby the spray may be directed toward the orifice to exactly center the spray relative to the orifice so that all the air passing through the orifice must pass through the liquid spray.

Another object of the invention resides in the provision of an air cleaner in which the air to be cleaned is drawn through a series of liquid sprays then through an eliminator to remove any liquid and foreign material from the air thence through a filter to remove the balance of any of the foreign material left in the air.

A still further object of the invention resides in the provision of an air cleaner which is provided with a plurality of units for removing the foreign material from the air and which is so constructed as to permit any one or more of the units to be used as desired depending upon the character of material in the air.

These objects and the several novel features of the invention are hereinafter more fully described and claimed and the preferred form of construction by which these objects are attained is shown in the accompanying drawings in which—

Fig. 3 is an enlarged detail of the means for securing one of the spray nozzles to the head.

Fig. 4 is a section taken on line 4—4 of Fig. 1.

Fig. 5 is a detail of the spray nozzle and plate.

Figure 1:
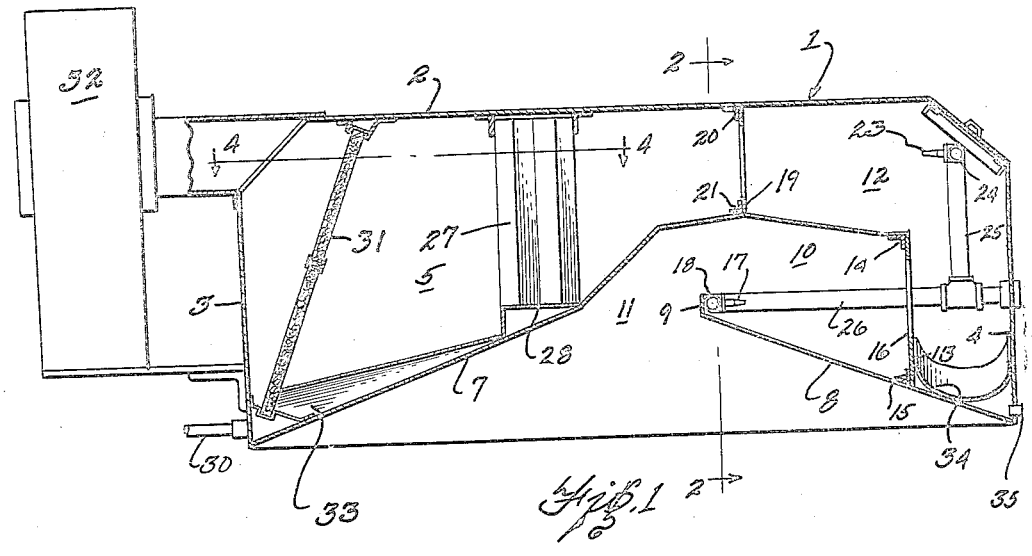
Fig. 1 is a section taken on line 1—1 of Fig. 2.
Figure 2:
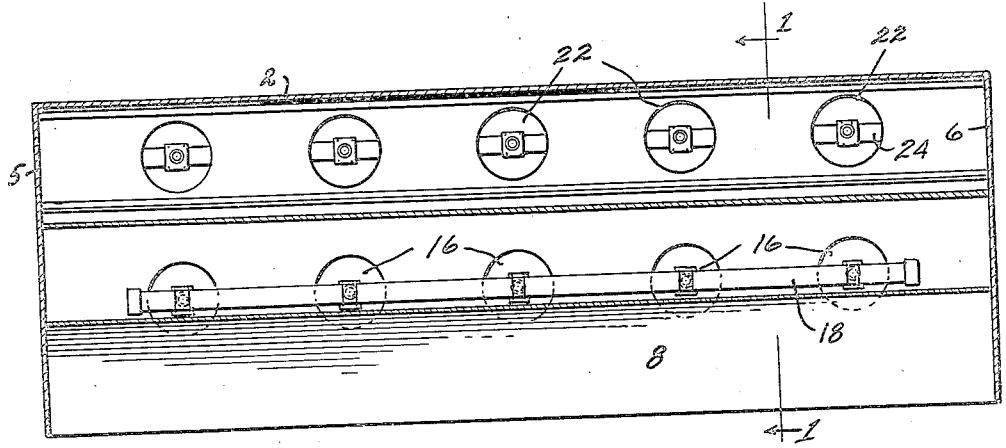
Fig. 2 is a section taken on line 2—2 of Fig. 1.

Referring to the drawings, the air cleaner indicated generally at 1 comprises the top wall 2, the side walls 3 and 4 and the end walls 5 and 6. The bottom wall 7 slopes from the lower edge of the side wall 3 upwardly toward the center of the cleaner and terminates at a point adjacent the wall 4. A wall 8 slopes upwardly toward the center from the lower edge of the side wall 4 and is provided with a vertical flange 9 and by referring to Fig. 1 it will be seen that the walls 7 and 8 form a conduit 10 opening to the throat 11 and to the conduit 12 formed by the plate 13 and the side wall 4 and the top wall 2 and the wall 7.

The plate 13 is secured, at its upper edge, to the angle iron 14 extending between the end walls 5 and 6 of the cleaner and the lower edge is secured to the angle iron 15 also extending between the end walls.

The plate 13 is provided with a plurality of apertures 16 which are axially aligned one with each of the spray nozzles 17 secured to the header or pipe 18, the same being supplied with liquid from any suitable source of supply (not shown). This source of supply is of such character as to maintain a uniform pressure on the nozzles. A plate 19 is positioned in the conduit 12 and is secured at its upper and lower edges to the respective angle irons 20 and 21 extending between the end walls of the cleaner. This plate 19 is likewise provided with a plurality of apertures 22 axially aligned one with each of the spray nozzles 23, the same being secured to the header 24 in a manner to be hereinafter more fully described. The header 24 is suitably connected by the pipes 25 and 26 to the header 18. An eliminator 27 is positioned in the conduit 12 and the lower end of the same rests on the portion 28 extending from the plate 7. The eliminator 27 is formed with a plurality of vertically extending plates 29 so shaped as to change the direction of the flow of air several times as it passes through the eliminator thereby giving time for the liquid and foreign material in the air to drain down over the face of the eliminator plates 29 and down over the upper surface of the wall 7 to the outlets 30, one positioned adjacent each of the end walls 5 and 6. A filter 31 is positioned between the side wall 3 and the eliminator 27 and while permitting passage of air therethrough will prevent passage of any foreign material that may be left in the air.

A suction fan 32 opens to the cleaner 1 adjacent the upper edge thereof and is arranged to draw air through the cleaner, as will be more fully described. The gutters 33 are positioned adjacent the lower edge of the side wall 3 to cause the liquid to flow relatively rapidly to the outlets 30 so that the foreign material in the liquid will not have a chance to settle. The gutters 34 positioned between the lower edge of the plate 13 and the side wall 4 slope downwardly from the end walls toward the outlet 35 to likewise keep the liquid from the spray nozzles continuously moving to prevent settling or precipitation of the foreign material in the liquid.

Referring now to Fig. 3, means for securing the spray nozzles to the header becomes readily apparent. The nozzle 17 may be of any well known construction which is capable of discharging a spray of conical form through one of the apertures 16. The nozzle 17 is threaded at 36 to receive the threaded end 37 of the plug 38, the same being provided with the central aperture 39 opening at one end to the header 18 and at its other end to the nozzle 17. The header 18 is provided with a tapered aperture 40 in which the semi-spherical end 41 of the plug 38 is positioned. A flange 42 is formed on the plug 38 and a plate 43 is provided with an aperture for receiving the plug 38 the plate being secured to the header 18 by means of the U bolts 45 and 46.

It will thus be seen that by loosening the nuts 47 on the ends of the U bolts 45 and 46 that the nozzle 17 may be swung in a plane at right angles to the axis of the header 18 or the nozzle may be swung in a plane parallel to the axis of the header by loosening the nuts 47 on the U bolt 46 and by tightening the nuts 47 on the U bolts 45. It will thus be seen that the nozzle 17 may be swung to any desired angle so that the spray therefrom is properly positioned relative to the aperture 16. This is a necessary and desirable feature where a plurality of nozzles are arranged along a single header and discrepancies in the construction of the nozzle or in drilling the holes in the header may be quickly and easily compensated for. It will be understood, of course, that the nozzles 23 are secured to the header 24 in a similar manner. Referring to Fig. 5, the path of the air is indicated by the arrows and all the air will be drawn through the spray as it passes through the aperture 16 in the plate 13 and inasmuch as the spray is of sufficient force to strike against the side wall 4 the air must pass out through the spray as it is drawn through the conduit 12 and the air will again be washed as it passes through the spray from the nozzles 23. The liquid from the nozzles 17 will drain out through the outlet 35 to any desired point and the liquid from the nozzles 23 will drain out through the outlets 30 to any suitable point.

It will be noted that due to the sharp edge apertures in the plates 13 and 19 a dead air space will be formed just inside the periphery of the apertures so that the air drawn through the cleaner will pass through the spray although the diameter of the spray passing through the apertures may be slightly less than the diameter of the apertures. By the arrangement of the nozzle and apertured plate described, the air laden with foreign material passes into the spray which, as previously stated, is under pressure and acquires the velocity and direction of movement of the spray and the air passes out of the spray at an angle to the direction of movement of the foreign material picked up by the spray.

It will be seen that one or more of the units for cleaning the air may be dispensed with depending upon the character of foreign material in the air. In other words, the filter or eliminator may be dispensed with or one stage of the washing operation without departing from the spirit of the invention or from the scope of the appended claims.

From the foregoing description it becomes evident that I have provided an air cleaner having a plurality of spray nozzles, the same being so arranged that all of the air drawn through the cleaner will pass through the spray to thoroughly wash the air passing therethrough.

Having thus fully described my invention, its utility and mode of operation, what I claim and desire to secure by Letters Patent of the United States is—

1. In an air cleaner, having an air inlet, and an outlet, a series of spray nozzles, means for drawing the air through the cleaner, a flat plate having an aperture therethrough for each of the nozzles and through which the respective nozzles discharge the spray to the opposite side of the plate and causing the air to pass through the spray in the aperture, said outlet being out of alignment with the inlet whereby the air in passing through the inlet is caused to pass out of the spray, an eliminator positioned in the path of travel of the air to remove any liquid or foreign material therefrom, and a filter also positioned in the path of travel of the air whereby foreign material in the air is prevented from passing therethrough.

2. An air cleaner, having an inlet, and an outlet, a suction fan connected to the outlet for drawing air from the inlet through the cleaner, a spray nozzle, means comprising a thin flat plate positioned at a distance from the nozzle and having a circular aperture axially aligned with the axis at the nozzle and whose diameter is approximately equal to the diameter of a cross section of the spray at the plate whereby the air is caused to pass through the spray as it passes through the cleaner, an eliminator whereby liquid and foreign material is removed from the air as it passes from the spray, and a filter whereby foreign material is prevented from passing through the cleaner.

3. An air cleaner having an inlet, and an outlet, means connected to the outlet for drawing air from the inlet through the cleaner, spray nozzles, means comprising a comparatively thin flat plate at a distance from the nozzles and having an aperture in its plane for each of the nozzles through which the respective nozzles discharge whereby the air is caused to pass through the spray as it passes through the cleaner, and a filter positioned in the path of travel of the air whereby the foreign material in the air is prevented from passing through the cleaner.

4. An air cleaner having an inlet and an outlet, means for passing air through the cleaner from the inlet to the outlet, a spray nozzle, means comprising a flat plate positioned at a distance from the nozzle and having an aperture in its plane whose axis is aligned with the axis of the nozzle whereby the spray is directed thereinto whereby the air is caused to pass through the spray and thence out of the spray as it passes through the aperture, a second nozzle and flat apertured plate therefor functioning like the first nozzle and plate and through which the air flows after passing from the spray of the first nozzles, and an eliminator positioned in the path of travel of the air to remove any liquid or foreign material therefrom.

5. An air cleaner having inlet and outlet openings, means for passing air from the inlet to the outlet, a plurality of spray nozzles, means comprising a plate having an aperture for each nozzle positioned at a distance therefrom, the spray nozzles and the respective apertures being in axial alignment and the plate being positioned at a right angle to the said axis, a second set of spray nozzles, a second plate for the second set of spray nozzles of the same construction and relative arrangement as the first plate relative to the first set of spray nozzles, said second plate and companion nozzles being out of alignment with the first plate and nozzles causing the air stream to move at an angle to the direction of movement of the spray from the first nozzles and pass therefrom to the second nozzles and plate, and means for removing any liquid from the air.

6. In an air cleaner having inlet and outlet openings, means for passing the air from the inlet to the outlet, a spray nozle adapted to form a spray of conical form, a flat plate in spaced relation to the nozzle having a sharp edged aperture therein axially aligned with the spray nozzle whereby all of the air is caused to pass through the spray to the opposite side of the plate.

7. In an air cleaner having inlet and outlet openings, means for passing the air through the cleaner from the inlet to the outlet, a spray nozzle adapted to form a spray of conical form, a flat plate in spaced relation to the spray nozzle having a circular aperture therein whereby all of the air is caused to pass through the spray from the nozzle as it passes through the aperture in the plate, and a second spray nozzle adapted to form a liquid spray of conical form, and a second flat plate in spaced relation thereto having a circular aperture therein axially aligned with the spray nozzle whereby all of the air passing through the first named spray is caused to pass through the spray from the second nozzle as it passes through the aperture in the second named plate.

8. In an air cleaner having inlet and outlet openings, means for passing the air from the inlet to the outlet, a spray nozzle adapted to form a spray of conical form, a flat plate in spaced relation to the nozzle having a circular aperture therein axially aligned with the spray nozzle with the plate occupying a plane at a right angle to the axial line extending from the spray nozzle to the axis of the aperture whereby all of the air is caused to pass through the spray as it moves through the aperture to the opposite side of the plate, and an eliminator positioned in the path of travel of the air to remove any liquid therefrom.

9. In an air cleaner having inlet and outlet openings, means for passing the air from the inlet to the outlet, a spray nozzle adapted to form a spray of conical form, a flat plate in spaced relation to the nozzle having a circular aperture therein axially aligned with the spray nozzle whereby all of the air is caused to pass through the spray and thence out of the spray as it moves through the aperture to the opposite side of the plate, an eliminator positioned in the path of travel of the air subsequent to its passing through the aperture to remove any liquid therefrom, and a filter also positioned in the path of travel of the air whereby foreign material in the air is prevented from passing through the cleaner.

10. In an air cleaner having inlet and outlet openings, means for passing air from the inlet to the outlet, a spray nozzle adapted to form a spray of conical form, a flat plate in spaced relation to the nozzle having a circular aperture therein axially aligned with the spray nozzle whereby all of the air is caused to pass through the spray and thence out of the spray as it moves through the aperture in the plate, there being a chamber on the opposite side of the plate from the nozzle into which the air may flow to beyond the influence of the spray, and a filter positioned in the path of travel of the air whereby foreign material in the air is prevented from passing through the cleaner.

11. In an air cleaning system, a chamber, a comparatively thin apertured plate at opposite ends thereof providing an inlet and an outlet opening, a spray nozzle exteriorly of the chamber in axial alignment with the aperture of the inlet plate for directing a conical spray of liquid therethrough to thereby cause air to pass into the chamber with the spray, a second nozzle in the chamber for discharging spray in conical form through the outlet aperture, the nozzles being spaced from the respective apertures and the second nozzle discharging in the same plane as the first nozzle and in reverse direction.

12. In an air cleaning system, a chamber having an inlet and an outlet through which air is passed, a comparatively thin apertured plate at the inlet and at the outlet through which the air is passed to and from the chamber, a spray nozzle exteriorly of the said chamber in axial alignment with the inlet aperture for directing a spray of liquid therethrough, a second nozzle in the chamber above the point of entrance of spray at the inlet and discharging through the outlet in a direction parallel to the direction of discharge of spray from the first nozzle.

13. In an air cleaner having an inlet and an outlet opening, means for passing the air through the cleaner from the inlet to the outlet, a spray nozzle discharging in a horizontal plane and adapted to form a spray of conical form, a plate positioned in a substantially vertical plane in spaced relation to the spray nozzle and having a circular aperture therein axially aligned with the spray and of a diameter approximately equal to the diameter of the cross section of the spray at the aperture whereby all the air is caused to pass through the spray from the nozzle as it passes through the aperture in the plate, there being a chamber on the opposite side of the plate from the nozzle, a second spray nozzle in said chamber above the point of discharge of the first nozzle thereinto, a second plate in spaced relation thereto and having a circular aperture therein axially aligned with the second spray nozzle whereby all the air passing through the first aperture is caused to change its direction of movement to pass through the spray of the second nozzle and aperture of the second plate, an eliminator positioned in the path of travel of the air to move any liquid therefrom, and a filter also positioned in the path of travel of the air whereby foreign material carried thereby is prevented from passing through the cleaner.

14. In an air cleaning system, a chamber through which air is caused to move from an inlet to an outlet, a plate having a circular aperture providing an inlet opening, a nozzle in axial alignment with the aperture for discharging a spray through the aperture, the chamber being of a form to cause the air to change its direction of flow in passing from the inlet to the outlet and being free from material obstruction or restriction to flow of air, the arrangement providing a means for causing material laden air to flow into the spray as it passes into the chamber and immediately out of the spray toward the outlet and the foreign material entering the spray with the air acquires the velocity and direction of movement of the spray whereby the air passing to the outlet is practically freed of foreign material.

FREDERICK P. BINGMAN.